(12) United States Patent
Pitti (10) Patent No.: US 10,397,787 B2
(45) Date of Patent: Aug. 27, 2019

(54) SYSTEM AND METHOD FOR AUTHENTICATING A USER BASED ON MAPPING A COMPUTING DEVICE WITH THE USER IDENTITY

(71) Applicant: NUCLEUS VISION, LLC, Grand Cayman (KY)

(72) Inventor: Abhishek Pitti, Attapur (IN)

( * ) Notice: Subject to any disclaimer, the term of this patent is extended or adjusted under 35 U.S.C. 154(b) by 0 days.

(21) Appl. No.: 16/130,294

(22) Filed: Sep. 13, 2018

(65) Prior Publication Data

US 2019/0082323 A1 Mar. 14, 2019

Related U.S. Application Data

(60) Provisional application No. 62/558,377, filed on Sep. 14, 2017.

(51) Int. Cl.

| | |
|---|---|
| *H04W 12/08* | (2009.01) |
| *H04W 8/20* | (2009.01) |
| *H04W 12/06* | (2009.01) |
| *H04L 29/06* | (2006.01) |
| *H04W 48/02* | (2009.01) |
| *H04L 9/32* | (2006.01) |
| *H04W 12/02* | (2009.01) |

(52) U.S. Cl.
CPC ........... *H04W 12/08* (2013.01); *H04L 9/3226* (2013.01); *H04L 63/083* (2013.01); *H04L 63/101* (2013.01); *H04W 8/20* (2013.01); *H04W 12/02* (2013.01); *H04W 12/06* (2013.01); *H04W 48/02* (2013.01)

(58) Field of Classification Search
CPC ........................... H04W 12/08; H04L 63/0815
See application file for complete search history.

(56) References Cited

U.S. PATENT DOCUMENTS

| | | | |
|---|---|---|---|
| 2014/0282943 A1* | 9/2014 | Nikankin | H04L 63/0884 |
| 2016/0248795 A1* | 8/2016 | Chien | H04L 63/1433 |
| 2016/0380999 A1* | 12/2016 | Tevlin | H04L 63/0815 |

* cited by examiner

*Primary Examiner* — Myron Wyche
(74) *Attorney, Agent, or Firm* — Eldredge Law Firm, LLC; Richard Eldredge; Beth Felix (57) ABSTRACT

A system to authenticate a user and a computing device includes a processing unit and a database which cause the processing unit to receive input from the user to select a wireless network; the wireless network having a specific IP address whitelisted by a wireless network solution provider; display a web-portal of the selected wireless network; receive a phone number of the user; receive a specified code from the user; provide the user with a predefined number of digits of an identification number of the computing device for use as a password; receive the predefined number of digits of the identification number of the computing device; and transmit a combination of the received predefined number of digits and a MSISDN to a server, the server transmits data to a telecom server and the telecom server initiates a search operation of the combination to authenticate the user on determining a match.

17 Claims, 4 Drawing Sheets

SYSTEM AND METHOD FOR AUTHENTICATING A USER BASED ON MAPPING A COMPUTING DEVICE WITH THE USER IDENTITY

BACKGROUND

1. Field of the Invention

The system of the present invention is related, in general, to a system and method to authenticate a user and a corresponding computing device, and specifically relates to a system and method to authenticate a user and a corresponding computing device by combining a identification number of the computing device with a mobile station international subscriber directory number (MSISDN).

2. Description of Related Art

Traditional authentication systems and methods use personal identification numbers (PINs), requiring the user to remember a fixed short sequence of digits. At each authentication attempt, the user provides this PIN. PINs can be made more secure by increasing their complexity, for example by making them longer, or requiring mixtures of upper and lower case letters and numerical digits. However, this increased complexity can be counterproductive, as users find the passcodes harder to commit to memory and either record them in some non-volatile way, such as keeping a written record with the device to which the password relates or by making frequent requests for password reminders or resets. Further, the existing system and methods use OTPs for authentication purposes. If the telecom operator's network condition is poor, the authentication operation is difficult through one-time password (OTP). The existing solutions for authenticating the computing device and the users are cumbersome and tedious.

Accordingly, although great strides have been made in the area of systems and methods of authentication, many shortcomings remain.

There is a need for a system and method which can enable the user to overcome the aforementioned problems which can utilize a combination of the identification number of a computing device and Mobile Station International Subscriber Directory Number (MSISDN) to authenticate a user and the corresponding computing device. Further, there is a need for a system and method to automatically sense the computing devices and validate the prior registered credentials of the user to provide direct access to a network or a digital platform. Furthermore, there is also a need for a system and method to prevent the use of the illegal terminal equipment by utilizing a combination of the identification number of the computing device and MSISDN.

Further limitations and disadvantages of conventional and traditional approaches will become apparent to one of skill in the art, through comparison of described systems with some aspects of the present disclosure, as set forth in the remainder of the present application and with reference to the drawings.

SUMMARY OF THE INVENTION

The present invention provides a means to solve problems discussed above by providing an improved system and method for authenticating a user and a corresponding computing device.

An aspect of the present disclosure relates to a method for authenticating a user and a corresponding computing device. The method comprises a step of receiving an input from the user to select a wireless network through a selection module. The wireless network having a specific IP address whitelisted by a wireless network solution provider. The method further comprises a step of displaying a web-portal of the selected wireless network through a display module. The method then includes a step of receiving a phone number of the user through a receiving module. Further, the method includes a step of allowing the user to enter a specified code prompted on a display screen of the computing device to receive a predefined number of digits of an identification number of the computing device through an identification module. The predefined number of digits are utilized as a password.

The method then includes a step of allowing the user to enter the predefined number of digits of the identification number of the computing device through a password module. Further, the method includes a step of transmitting a combination of the received predefined number of digits and mobile station international subscriber directory number (MSISDN) to a server. In one aspect, the remotely placed server transmits the received data to a telecom server. The telecom server initiates a search operation of the combination of MSISDN and the predefined number of digits of the identification number of the computing device to authenticate the user upon determining a match. The method then includes a step of displaying a message of a match or a non-match through a message module. Furthermore, the method includes a step of allowing the user to access the selected wireless network on confirming a match through an authentication module.

In one aspect of the present invention, the telecom server transmits a notification signal to the computing device of the user about the failed authentication on determining a non-match of the combination of MSISDN and the predefined number of digits of the identification number of the computing device.

In one aspect of the present invention, the authentication module automatically identifies the computing device with the predefined number of digits of the identification number of the computing device in conjunction with a wireless unit and a sensor unit.

In one aspect of the present invention, the authentication module automatically senses a pre-registered computing device and authenticates prior registered credentials of the user to provide direct access to the selected wireless network or a digital platform.

In one aspect of the present invention, the authentication module integrates a pixel to a browser of the computing device. The pixel stores a phone number of the user and last four digits of the identification number of the computing device.

One aspect of the present invention relates to a system for authenticating a user and a corresponding computing device. The system comprising a processing unit and a database. The processing unit processes the data received from the computing devices. The database being configured to store machine-readable instructions that when executed by the processing unit cause the processor to receive an input from the user to select a wireless network through a selection module. The wireless network is having a specific IP address whitelisted by a wireless network solution provider.

The processor is further configured to display a web-portal of the selected wireless network through a display module. Then the processor is configured to receive a phone number of the user through a receiving module. The processor is configured to allow the user to enter a specified code prompted on a display screen of the computing device to receive a predefined number of digits of an identification number of the computing device through an identification module. The predefined number of digits are utilized as a password.

Further, the processor is configured to allow the user to enter the predefined number of digits of the identification number of the computing device through a password module. Furthermore, the processor is configured to transmit a combination of the received predefined number of digits and mobile station international subscriber directory number (MSISDN) to a remotely placed server. The remotely placed server transmits the received data to a telecom server. The telecom server initiates a search operation of the combination of MSISDN and the predefined number of digits of the identification number of the computing device to authenticate the user on determining a match. The processor is then configured to display a message of a match or a non-match through a message module. Furthermore, the processor is configured to allow the user to access the selected wireless network on confirming a match through an authentication module.

Accordingly, one advantage of the present invention is that it authenticates the users or customers without having to remember username and passwords. Another advantage of the present invention is that it provides secure authentication of the customers through their computing devices and phone numbers. Yet, another advantage of the present invention is that the computing device is authenticated without OTP in case the telecom operator's network is poor. Still another advantage of the present invention is that the users get rid of the hassle to check OTPs and toggle between the screens to retrieve the OTP. Another advantage of the present invention is that it provides a smooth and seamless log-in experience for the users across all the telecom service providers and computing devices. Another advantage of the present invention is that the present system and method substantially reduces the cost of an infrastructure set up to accomplish OTPs operations by just mapping the user's phone number and the identification number of the computing device through the integrated telecom operators.

Other features of embodiments of the present disclosure will be apparent from accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. As we realized, the invention is capable of other and different embodiments, and its several details are capable of modifications in various obvious respects, all without departing from the invention. Accordingly, the drawings and description thereof are to be regarded as illustrative in nature, and not as restrictive.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional authentication systems. Specifically, the present invention provides for an improved and efficient means to authenticate a user and a corresponding computing device. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

Figure 1:
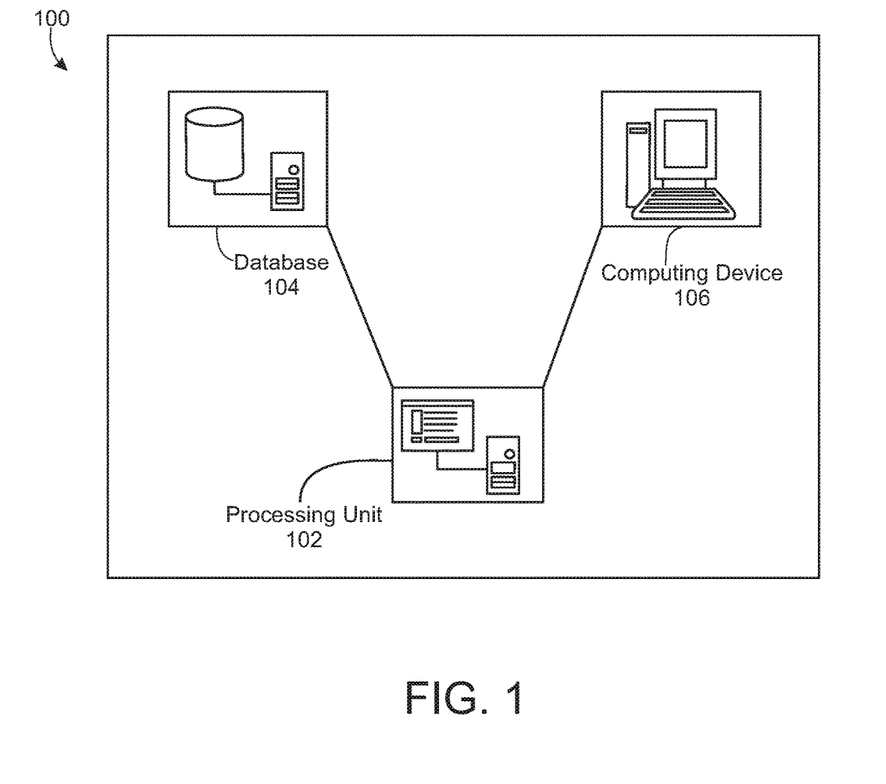
FIG. 1 is a simplified diagram of a system for authenticating a user based on mapping a computing device with a user identity in accordance with a preferred embodiment of the present application.

Referring now to the drawings wherein like reference characters identify corresponding or similar elements throughout the several views, FIG. 1 depicts a diagram of an authentication system 100 to authenticate a user based on mapping a computing device 106 with a user identity in accordance with a preferred embodiment of the present application.

In the contemplated embodiment, system 100 includes the computing device 106 which can include, but is not limited to, a personal digital assistant (PDA), a mobile device, a tablet, a smartphone or any other computing device.

The system 100 further includes a processing unit 102 and a database 104. The processing unit 102 is configured to process data received from one or more computing devices 106. The database 104 is configured to store one or more instruction about the authentication of the user and information of the authenticated users. IT should be appreciated that the database 104 is realized through various technologies such as, but not limited to, Microsoft® SQL Server, Oracle®, IBM DB2®, Microsoft Access®, PostgreSQL®, MySQL® and SQLite®, and the like.

The processing unit 102 is configured to execute a plurality of instructions stored in the database 104. In the preferred embodiment, the computing device 106 is integrated with the processing unit 102. A person with ordinary skills in the art would understand that the scope of the disclosure is not limited to the database 104 as a separate element. In an embodiment, the functionalities of the database 104 may integrate into the processing unit 102.

In one embodiment, the processing unit 102 refers to a software framework being configured to host an application or a software service. In an embodiment, the processing unit 102 is implemented to execute procedures such as, but not limited to, programs, routines, or scripts stored in one or more memories for supporting the hosted application or the software service. In an embodiment, the hosted application or the software service is configured to perform one or more predetermined operations. The processing unit 102 is realized through various types of application servers such as, but not limited to, a Java application server, a .NET framework application server, a Base4 application server, a PHP framework application server, or any other application server framework known or developed within the art.

In one embodiment, the processing unit 102 is configured to establish communication between the computing device 106 and the database 104 over a communication network. Such communication is performed, in accordance with various wireless communication protocols. Examples of such wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network includes, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
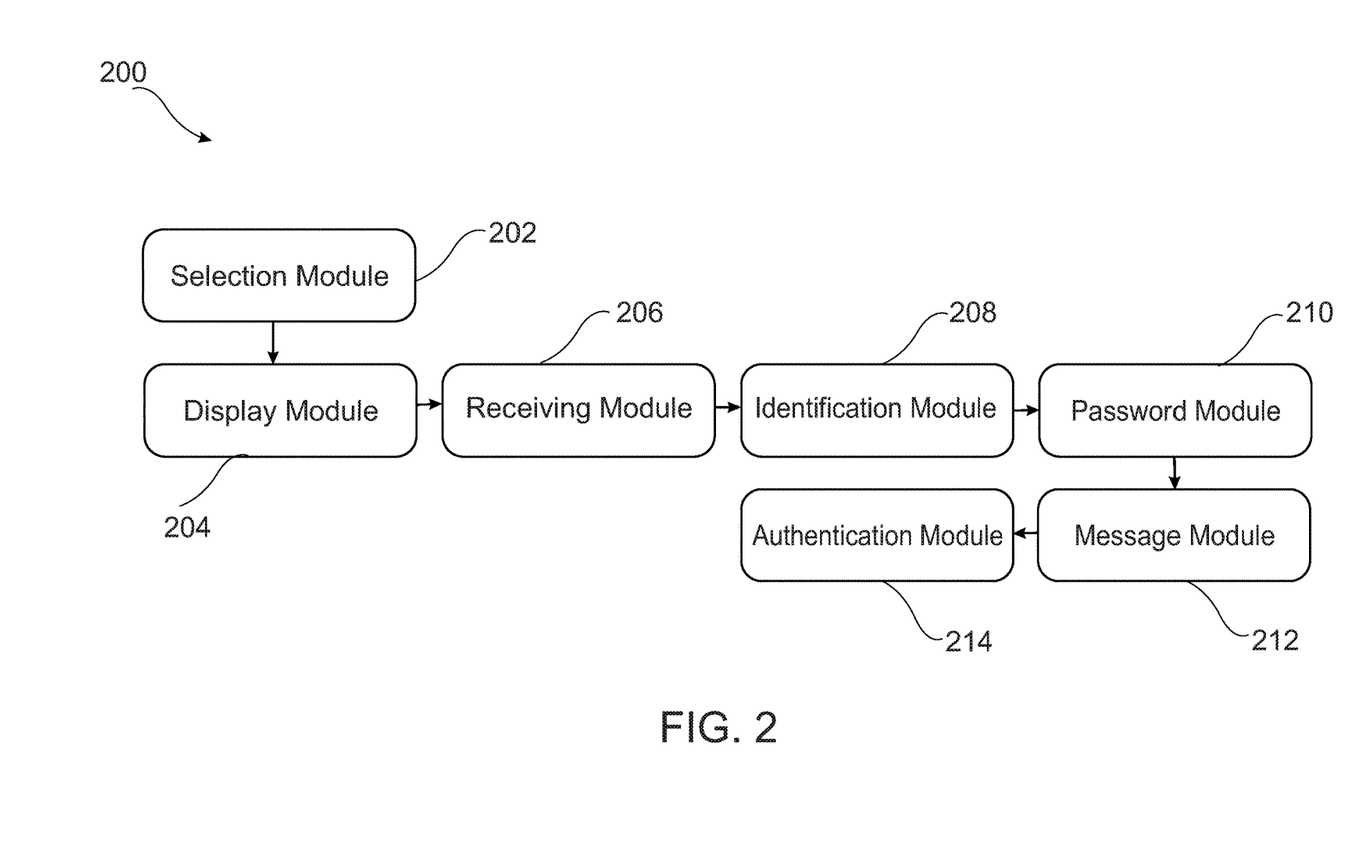
FIG. 2 is a simplified flowchart of a plurality of modules associated with the computing device of FIG. 1 in accordance with the preferred embodiment of the present application.

FIG. 2 illustrates a block diagram 200 of the various modules configured with the computing device 106 (shown in FIG. 1), in accordance with an embodiment of the present invention. The computing device 106 includes an integrated algorithmic module which includes a selection module 202, a display module 204, a receiving module 206, an identification module 208, a password module 210, a message module 212, and an authentication module 214. In one implementation, the selection module 202 is configured to receive an input from the user to select a wireless network. The wireless network having a specific IP address whitelisted by a wireless network solution provider. In the preferred embodiment, the display module 204 displays a web-portal of the selected wireless network.

As shown in FIG. 2, in the contemplated embodiment, the receiving module 206 is configured to receive a phone number of the user and from the user. The received phone number is preferably encrypted to make sure that the data is secure. In this embodiment, the receiving module 206 utilizes an AES 256 algorithm, or similar technology, to encrypt the phone number of the user. The identification module 208 allows the user to enter a specified code such as *#06# prompted on a display screen of the computing device 106 which provides a command to receive a predefined number of digits of an identification number of the computing device. In this embodiment, the identification number of the computing device is an International Mobile Equipment Identity, or IMEI used to identify 3GPP and iDEN based computing devices. In an embodiment, the predefined number of digits (preferably four digits) are utilized as a password by the user for authentication. The password module 210 allows the user to enter the predefined number of digits of the identification number of the computing device 106. Then a combination of the received predefined number of digits, and mobile station international subscriber directory number (MSISDN) is transmitted wirelessly to a server, such as a remotely placed server.

Further, the server is configured to transmit the received data to a telecom server. The telecom server thereby being configured to initiate a search operation of the combination of MSISDN and the predefined number of digits of the identification number of the computing device 106 to authenticate the user on determining a match. In an embodiment, the search operation is performed in a relational database which is updated in real time.

In an embodiment, the telecom server transmits a notification signal to the computing device 106 of the user about the failed authentication on determining a non-match of the combination of MSISDN and the predefined number of digits of the identification number of the computing device 106. In an embodiment, the present system utilizes machine learning algorithms (typically associated rules and random forest algorithms) to learn the user/subscriber behavior for authentication requests, transactions, usage time, etc.

In the preferred embodiment, the message module 212 of the computing device is configured to display a message of a match (success) or a non-match (failure). If the received predefined number of digits matches with the actual digits of the identification number of the computing device then the message module 212 displays the success message. Alternatively, if the received predefined number of digits do not match with the actual digits of the identification number of the computing device 106 then the message module 212 displays the failure message. On receiving the failure message, the computing device 106 enables the user to generate a one-time password (OTP) to access the wireless network.

The authentication module 214 is configured to allow the user to access the selected wireless network on confirming a match. In an embodiment, the authentication module 214 is configured to automatically identify the computing device 106 with the predefined number of digits of the identification number of the computing device 106 in conjunction with the wireless unit and the sensor unit. The sensor unit is communicatively coupled with the wireless unit of the wireless service provider. In an embodiment, the authentication module 214 automatically senses a pre-registered computing device and authenticates prior registered credentials of the user to provide direct access to the selected wireless network or a digital platform. In an embodiment, the authentication module 214 integrates a pixel to a browser of the computing device. The pixel stores a phone number of the user and last four digits of the identification number of the computing device 106.

In an alternative embodiment, the present system may utilize a sensor unit to authenticate the computing device 106 of the user. The sensor unit is communicatively coupled with a wireless unit of the wireless network solution provider. Typically, each sensor unit and the wireless unit is having an identification number. Every time the user/customer connects to the wireless unit, a landing page for login opens up on the computing device of the user, and the user has to enter the mobile number in the landing page. The authentication module 214 recognizes the identification number of the wireless unit along with the mobile number entered by the user.

It should be appreciated that since the user has to be in the vicinity of the sensor unit to connect with the wireless unit, therefore the identification number of the computing device is captured by the sensor unit. The mobile number, the identification number of the computing device and the wireless unit and the identification number of the sensor unit are transmitted to the remotely placed server. The remotely placed server matches the stored combination of the identification number of the wireless unit and the sensor unit with the corresponding mobile number and the captured identification number of the computing device. In case the mobile number and the identification number of the computing device is captured by an already existing combination of the sensor unit and the wireless unit then this combination of the mobile number and the identification number of the computing device is transmitted to the telecom server to validate the authenticity of the mobile number and identification number of the computing device combination. In case, the telecom server confirms the combination; then the authentication is successful. If the telecom server is not confirming the combination, then the user will be prompted to follow the OTP route.

Figure 3:
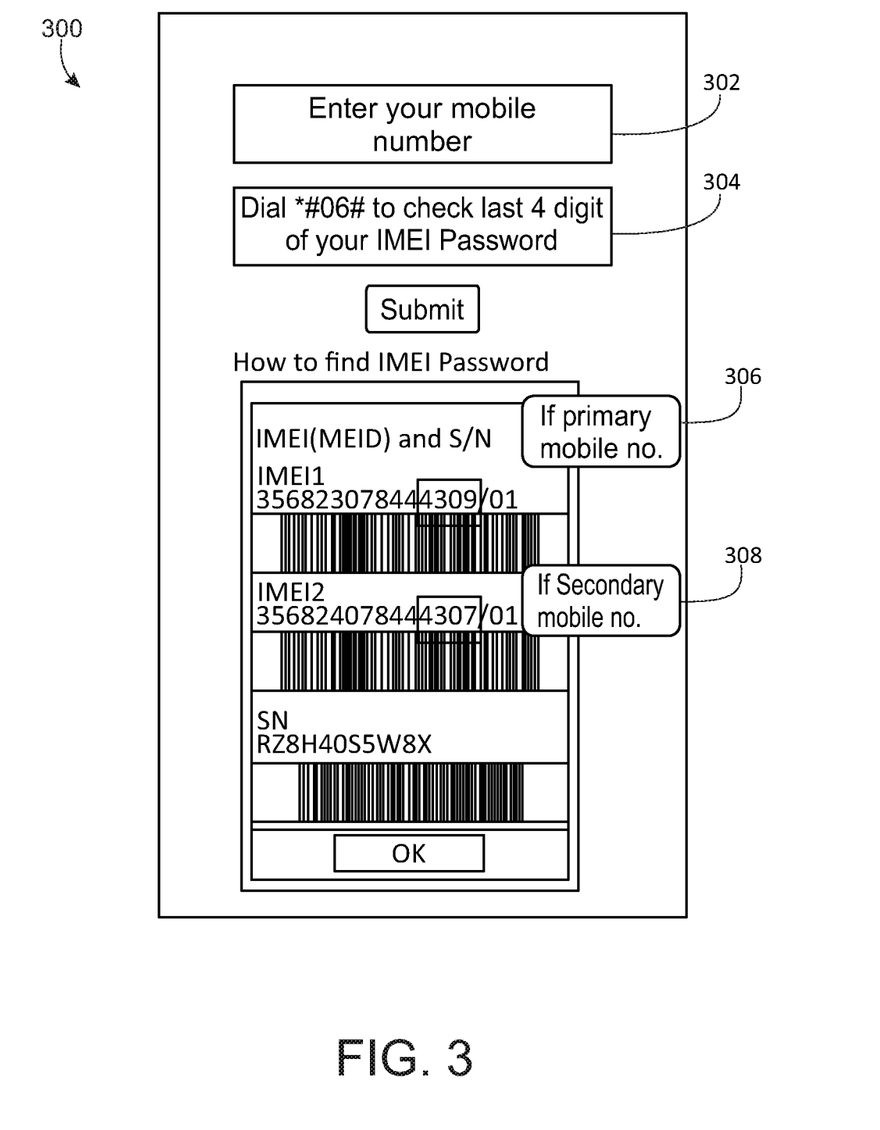
FIG. 3 is a screenshot of a display module of FIG. 2 in accordance with the preferred embodiment of the present application.

FIG. 3 illustrates an exemplary screenshot 300 of the display module 204 (shown in FIG. 2), in accordance with an embodiment of the present invention. The screenshot shows a first portion 302 to receive the mobile number of the user. A second portion 304 instructs the user to dial *#06# (or other code previously created) to get the last four digits of the identification number of the computing device 106. Screenshot 300 depicts a third portion 306 to instruct the user to find the identification number of the computing device, in case the provided phone number is primary, and a fourth portion 308 instructs the user to find the identification number of the computing device 106, in case the provided phone number is secondary.

In operation, when the user tries to log-in and a captive portal is displayed on their screen, the captive portal prompts the user to enter his/her phone number and the first or last 4-8 digits of the identification number of the computing device. This combination of mobile number and identification number of the computing device is received by a remotely placed server. Then the combination is pushed to an integrated telecom operator's server for mapping and verification by the telecom server. If the combination is found, the customer receives the successful authentication message and would be able to successfully log-in to their preferred website or app. If the authentication fails, the standard one-time password (OTP) flow is evoked.

Figure 4:
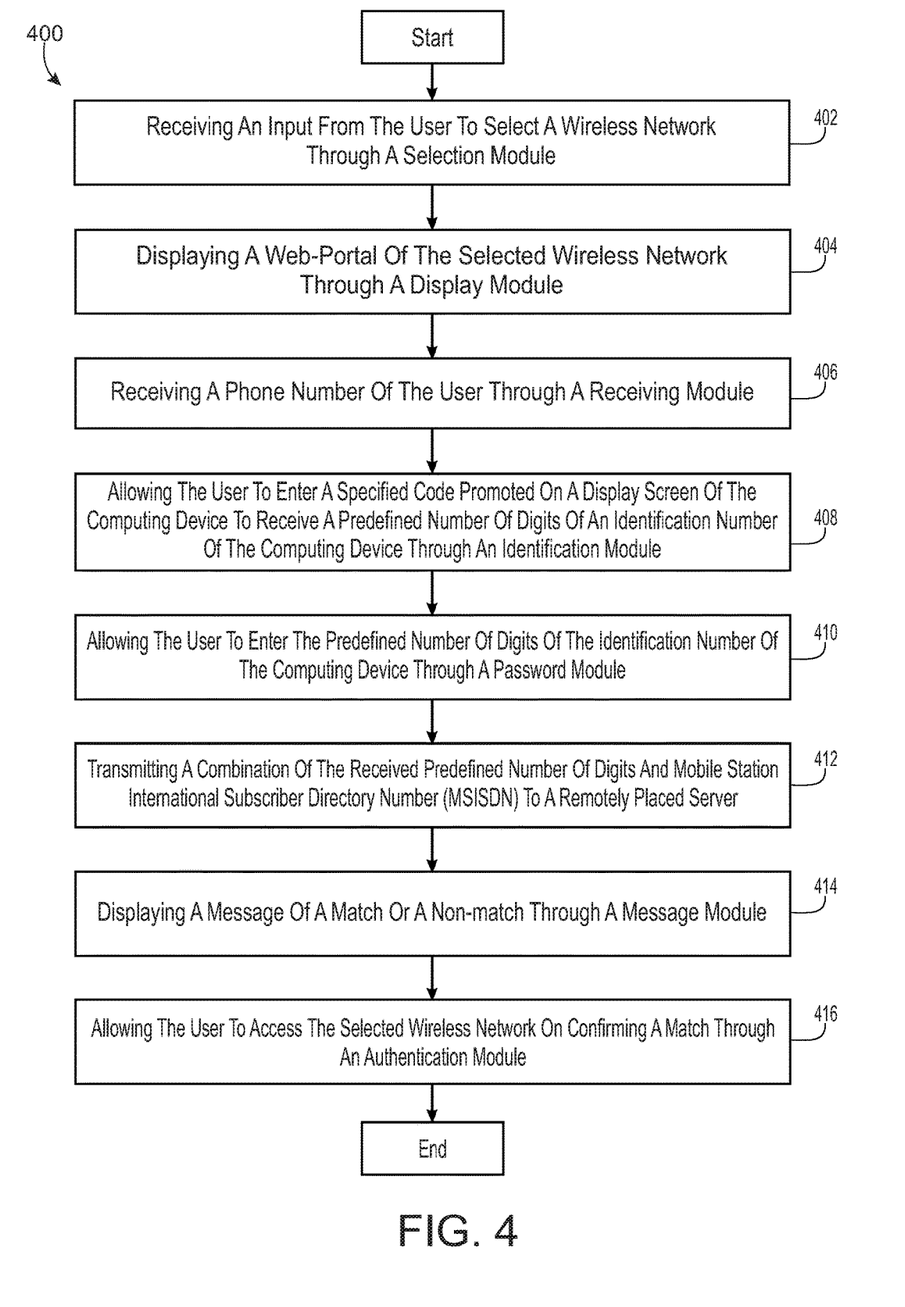
FIG. 4 is a flowchart of a method for authenticating a user and a corresponding computing device in accordance with a preferred embodiment of the present application.

FIG. 4 illustrates a flowchart 400 of the method for authenticating a user and a corresponding computing device, in accordance with an embodiment of the present invention. The method initiates with a step 402 of receiving an input from the user to select a wireless network through a selection module. The wireless network is having a specific IP address whitelisted by a wireless network solution provider. The method further includes a step 404 of displaying a web-portal of the selected wireless network through a display module. The method then includes a step 406 of receiving a phone number of the user through a receiving module. Further, the method includes a step 408 of allowing the user to enter a specified code prompted on a display screen of the computing device to receive a predefined number of digits of an identification number of the computing device through an identification module. The predefined number of digits are utilized as a password.

The method then includes a step 410 of allowing the user to enter the predefined number of digits of the identification number of the computing device through a password module. Further, the method includes a step 412 of transmitting a combination of the received predefined number of digits and mobile station international subscriber directory number (MSISDN) to a remotely placed server. The remotely placed server transmits the received data to a telecom server. The telecom server initiates a search operation of the combination of MSISDN and the predefined number of digits of the identification number of the computing device to authenticate the user on determining a match. The method then includes a step 414 of displaying a message of a match or a non-match through a message module. Furthermore, the method includes a step 416 of allowing the user to access the selected wireless network on confirming a match through an authentication module.

Thus, the present system and method provide secure authentication of the users or customers on any websites or applications by unique mapping of customer identity (mobile numbers) and the identification number of the computing device through a telecom database. The regular customers do not need to enter their phone numbers for subsequent log-in. The present system and method provide a seamless, secure and cost-effective authentication process for the user as well as the service providers.

It should be appreciated that one of the unique features believed characteristic of the present application is the convenient means to authenticate a user and a computing device, the means providing efficiency and ease for the user.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method for authenticating a user and a corresponding computing device, the method comprising:
   receiving input from the user to select a wireless network through a selection module associated with the corresponding computing device, the wireless network having a specific IP address whitelisted by a wireless network solution provider;
   displaying a web-portal of a selected wireless network through a display module of the corresponding computing device;
   receiving a phone number of the user;
   receiving a specified code from the user, the specified code being prompted on a display screen of the corresponding computing device;
   providing the user with a predefined number of digits of an identification number of the corresponding computing device through an identification module, wherein the predefined number of digits are utilized as a password;
   receiving the predefined number of digits of the identification number of the corresponding computing device through a password module associated with the corresponding computing device;
   transmitting a combination of the received predefined number of digits and a mobile station international subscriber directory number (MSISDN) to a server, wherein the server transmits data to a telecom server and wherein the telecom server initiates a search operation of the combination to authenticate the user on determining a match; and
   allowing the user to access the selected wireless network on confirming the match through an authentication module, wherein the authentication module integrates a pixel to a browser of the corresponding computing device.

2. The method of claim 1, further comprising:
   displaying a message of the match through a message module of the corresponding computing device.

3. The method of claim 2, wherein the authentication module automatically identifies the corresponding computing device with the predefined number of digits of the identification number of the computing device in conjunction with a wireless unit and a sensor unit, wherein the sensor unit is communicatively coupled with the wireless unit of the wireless service provider.

4. The method of claim 2, wherein the authentication module automatically senses a pre-registered computing device and authenticates prior registered credentials of the user to provide direct access to the selected wireless network.

5. The method of claim 2, wherein the pixel stores the phone number of the user and last four digits of the identification number of the corresponding computing device.

6. The method of claim 1, further comprising:
   displaying a message of a non-match through a message module of the corresponding computing device; and
   preventing the user from access to the selected wireless network on confirming an absence of the match through the authentication module.

7. The method of claim 6, wherein the authentication module automatically identifies the corresponding computing device with the predefined number of digits of the identification number of the computing device in conjunction with a wireless unit and a sensor unit, wherein the sensor unit is communicatively coupled with the wireless unit of the wireless service provider.

8. The method of claim 6, wherein the pixel stores the phone number of the user and last four digits of the identification number of the corresponding computing device.

9. A system to authenticate a user and a computing device of the user, the system comprising:
   a processing unit configured to process data received from the computing device; and
   a database configured to store machine-readable instructions that when executed by the processing unit cause the processing unit to: receive input from the user to:
   receive input from the user to select a wireless network through a selection module associated with the computing device, the wireless network having a specific IP address whitelisted by a wireless network solution provider;
   display a web-portal of the selected wireless network through a display module of the computing device;
   receive a phone number of the user;
   receive a specified code from the user, the specified code being prompted on a display screen of the corresponding computing device;
   provide the user with a predefined number of digits of an identification number of the computing device through an identification module, wherein the predefined number of digits are utilized as a password;
   receive the predefined number of digits of the identification number of the computing device through a password module associated with the computing device;
   transmit a combination of the received predefined number of digits and a mobile station international subscriber directory number (MSISDN) to a server, wherein the server transmits data to a telecom server and wherein the telecom server initiates a search operation of the combination authenticate the user on determining a match; and
   allow the user to access the selected wireless network on confirming the match through an authentication module, wherein the authentication module integrates a pixel to a browser of the corresponding computing device.

10. The system of claim 9, wherein the database is further configured to cause the processor to:
    display a message of a match through a message module of the computing device.

11. The system of claim 10, wherein the authentication module automatically identifies the corresponding computing device with the predefined number of digits of the identification number of the computing device in conjunction with a wireless unit and a sensor unit, wherein the sensor unit is communicatively coupled with the wireless unit of the wireless service provider.

12. The system of claim 10, wherein the authentication module automatically senses a pre-registered computing device and authenticates prior registered credentials of the user to provide direct access to the selected wireless network.

13. The system of claim 10, wherein the pixel stores the phone number of the user and last four digits of the identification number of the corresponding computing device.

14. The system of claim 9, further comprising:

displaying a message of a non-match through a message module of the corresponding computing device; and preventing the user from access the selected wireless network on confirming an absence of a match through the authentication module.

15. The system of claim 14, wherein the authentication module automatically identifies the corresponding computing device with the predefined number of digits of the identification number of the computing device in conjunction with a wireless unit and a sensor unit, wherein the sensor unit is communicatively coupled with the wireless unit of the wireless service provider.

16. The system of claim 14, wherein the pixel stores the phone number of the user and last four digits of the identification number of the corresponding computing device.

17. The system of claim 9, wherein the telecom server transmits a notification signal to the computing device of the user about the failed authentication on determining a non-match of the combination of MSISDN and the predefined number of digits of the identification number of the computing device.

* * * * *